US006422751B1

(12) United States Patent
Aufrichtig et al.

(10) Patent No.: US 6,422,751 B1
(45) **Date of Patent: *Jul. 23, 2002**

(54) METHOD AND SYSTEM FOR PREDICTION OF EXPOSURE AND DOSE AREA PRODUCT FOR RADIOGRAPHIC X-RAY IMAGING

(75) Inventors: Richard Aufrichtig, Wauwatosa; Gary F. Relihan, Nashotah; Clarence L. Gordon, III, Waukesha, all of WI (US); Baoming Ma, Latham, NY (US)

(73) Assignee: General Electric Company, Waukesha, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,779

(22) Filed: Aug. 7, 1998

(51) Int. Cl.[7] .............................................. G01D 18/00

(52) U.S. Cl. ...................................................... 378/207

(58) Field of Search ................................ 378/207, 115, 378/116

(56) References Cited

U.S. PATENT DOCUMENTS 5,694,449 A * 12/1997 Aragones .................... 378/115

OTHER PUBLICATIONS

"Physics of Radiology" Wolfbarst et al, Prentice Hall 1993 p 94–101.*

"Christensens Physics of Diagnostic Radiology" Thomas Curry, pp 33–35, 88–92, 96–98, 225–226, 1990.*

"The Physics of Radiology"; Johns et al.; Charles C. Thomas, Publisher, Springfield, Illinois; pp. 64–66, 234–235, 244–246, and 217–269 (Fourth edition, 1983).

Publication 788 entitled "Medical radiology—Terminology"; International Electrotechnical Commission—IEC Standard; pp. 17–18 (First edition, 1984).

* cited by examiner

*Primary Examiner*—Craig E. Church
(74) *Attorney, Agent, or Firm*—Foley & Lardner; Peter J. Vogel; Michael A. Della Penna

(57) ABSTRACT

A neural network prediction has been provided for predicting radiation exposure and/or Air-Kerma at a predefined arbitrary distance during an x-ray exposure; and for predicting radiation exposure and/or Air-Kerma area product for a radiographic x-ray exposure. The Air-Kerma levels are predicted directly from the x-ray exposure parameters. The method or model is provided to predict the radiation exposure or Air-Kerma for an arbitrary radiographic x-ray exposure by providing input variables to identify the spectral characteristics of the x-ray beam, providing a neural net which has been trained to calculate the exposure or Air-Kerma value, and by scaling the neural net output by the calibrated tube efficiency, and the actual current through the x-ray tube and the duration of the exposure. The prediction for exposure/Air-Kerma further applies the actual source-to-object distance, and the prediction for exposure/Air-Kerma area product further applies the actual imaged field area at a source-to-image distance.

11 Claims, 2 Drawing Sheets

METHOD AND SYSTEM FOR PREDICTION OF EXPOSURE AND DOSE AREA PRODUCT FOR RADIOGRAPHIC X-RAY IMAGING

TECHNICAL FIELD

The present invention relates to x-ray system measurements, and, more particularly, to radiation exposure or Air-Kerma prediction for radiographic x-ray exposures.

BACKGROUND ART

Extensive scientific work has been done in the x-ray field measuring x-ray tube output in terms of radiation exposure (expressed in units of Roentgen) and Air-Kerma (expressed in units of Gray). This quantity is also known as the absorbed x-ray dose in air. Kerma stands for Kinetic Energy Released in the Medium and quantifies the amount of energy from the x-ray beam absorbed per unit mass. Radiation exposure is related to energy absorbed specifically in a given volume of air.

From a regulatory point of view, absorbed radiation dose or radiation exposure to the patient is often the key parameter of concern. Today, the general policy is to protect patients from unreasonable radiation dose, while still allowing the radiologist to obtain an image of acceptable quality. To control the level of exposure, new regulations, some already in effect in certain countries, require dose area product levels during an x-ray procedure to be reported. Furthermore, with ever-increasing concern for the quality of care, there is increased interest in regulatory evaluation of x-ray equipment.

Various methods have evolved to measure, predict, and control this x-ray quantity. In a current system, the "Dose Area Product" (reporting either radiation exposure or Air-Kerma) is measured directly with an ion chamber positioned in front of the collimator at the output of the x-ray tube. Alternatively, this quantity can also be predicted by monitoring x-ray techniques used in an exposure and, after calibrating radiation exposure measurements, then calculating and reporting the value.

Unfortunately, use of an ion chamber probe degrades the performance of the x-ray system, as the probe acts as an unnecessary attenuator in the x-ray beam. Additionally, the second method requires extensive calibrations that are not practical for many systems.

Therefore, due to the increasing demands in x-ray system performance, reduced system calibration needs, and increasing regulatory control, a new, predictive, non-invasive method for gathering reliable, non-falsifiable patient entrance exposure information, is desired.

SUMMARY OF THE INVENTION

In accordance with one preferred embodiment, a system is provided that predicts radiation exposure/Air-Kerma at a predefined patient entrance plane and the radiation exposure/Air-Kerma area product during a radiographic x-ray exposure. With this system, the need for the ion chamber and/or extensive system calibration are eliminated, as the radiation exposure/Air-Kerma levels are predicted directly from the x-ray exposure parameters. Additionally, this system satisfies known regulatory requirements in radiographic x-ray exposures. Additionally, the present invention satisfies known regulatory requirements in radiographic x-ray exposures.

In accordance with another preferred embodiment, a method is provided to predict the radiation exposure of Air-Kerma for an arbitrary radiographic x-ray exposure by providing input variables to identify the spectral characteristics of the x-ray beam, providing a neural net which has been trained to calculate the exposure or Air-Kerma value, and by scaling the neural net output by the calibrated tube efficiency, the actual mAs and the actual source-to-object distance.

The preferred embodiments provide a radiation exposure/Air-Kerma prediction at a predefined patient entrance plane; and further to provide a radiation exposure/Air-Kerma area product prediction during a radiographic x-ray exposure. This makes it possible to eliminate the use of a measuring probe that otherwise would have to be installed on the x-ray system, providing the advantages of reducing system cost and simplifying system packaging and power supplies. This also makes it possible to significantly reduce system calibrations needed for this reported measurement.

DETAILED DESCRIPTION OF THE PREFERRED EMBODIMENTS

Figure 1:
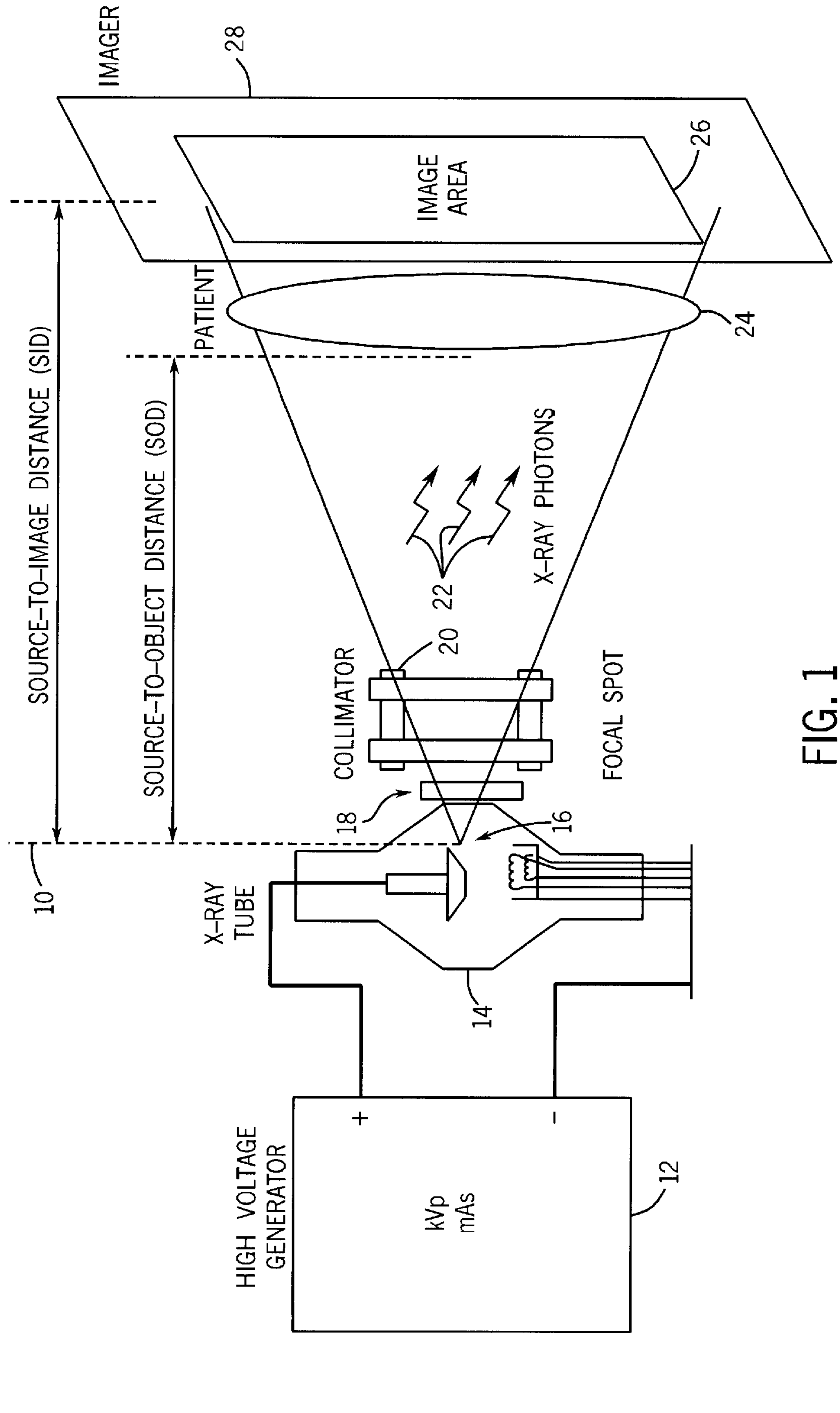
FIG. 1 is a block diagram of an x-ray imaging system.

A neural network prediction of the radiation exposure/Air-Kerma at a predefined arbitrary distance during a radiographic x-ray exposure, and the radiation exposure/Air-Kerma area product for a radiographic x-ray exposure is now described. Referring to FIG. 1, the prediction of the radiation exposure/Air-Kerma is reported at a plane 10 defined by the Source-to-Object (SOD) distance shown. A high voltage generator 12 outputs the peak voltage (kVp) applied on an x-ray tube, and the current through the x-ray tube and duration of the exposure (mAs) to an x-ray tube 14. X-rays emanate from focal spot 16, through A1 and Cu filters 18 and collimator 20, generating x-ray photons indicated by arrows 22, which x-rays are transmitted through the object 24 under study, typically a human patient. An image is then output on image area 26 of imager 28.

Figure 2:
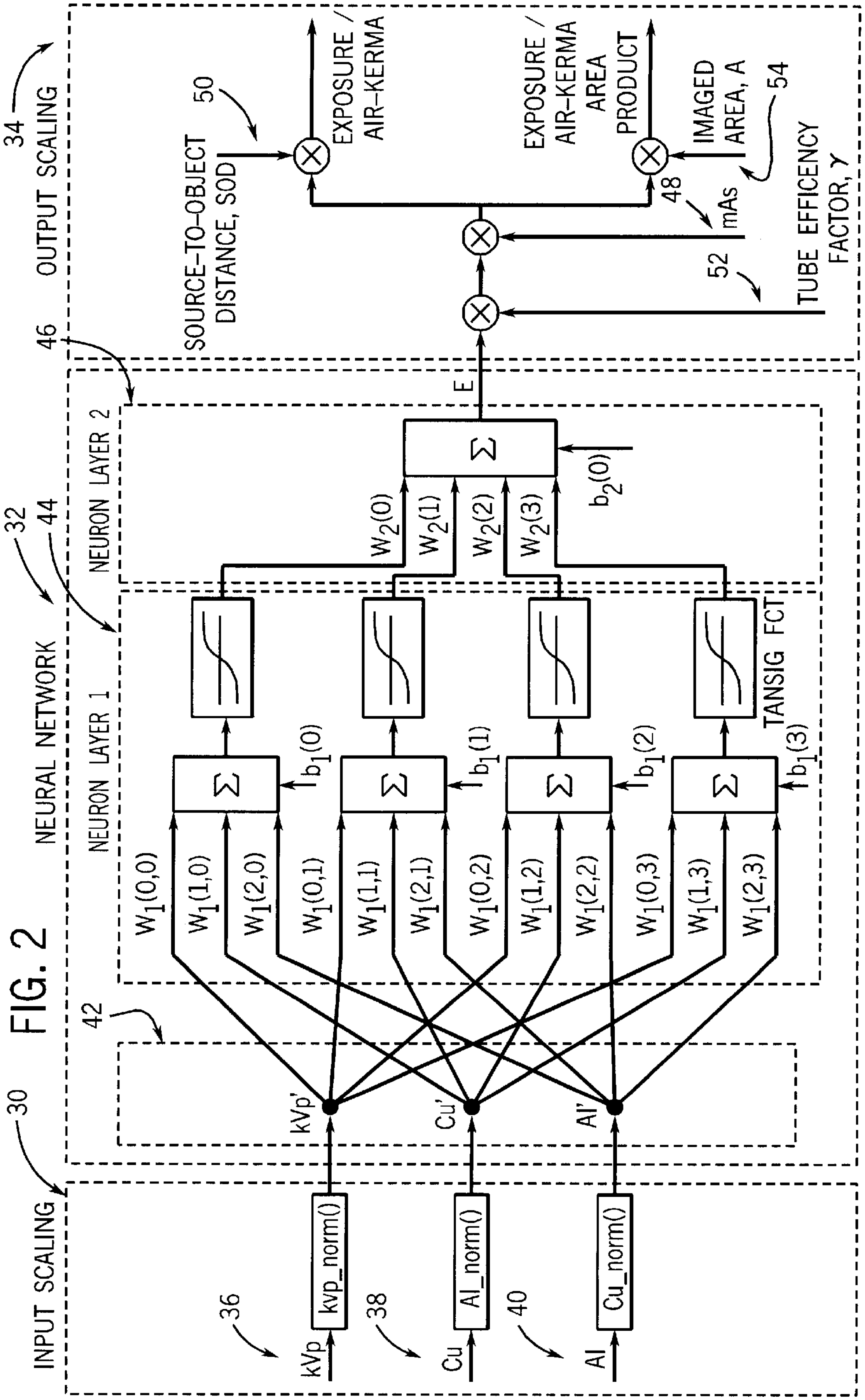
FIG. 2 is a neural net model for calculating the radiation exposure/Air-Kerma and the radiation exposure/Air-Kerma area product, relative to an x-ray imaging system such as is illustrated in FIG. 1, in accordance with the present invention.

Referring now to FIG. 2 and continuing with FIG. 1, the prediction of the radiation exposure/Air-Kerma and the radiation exposure/Air-Kerma area product is based upon an input scaling stage 30, a neural net model 32, and an output scaling stage 34.

The input scaling stage 30, is based on the peak voltage (kVp) information input at 36; the type of spectral filters, i.e., copper filter thickness, input at 38; and aluminum filter thickness input at 40.

The neural net model 32 is a two-layer neural network which has three input variables 42, four hidden-neurons 44, and one output neuron 46.

The output scaling function 34 uses values for current through the x-ray tube and duration of the exposure (mAs) input at 48; source to object 24 (patient) distance (SOD) input at 50; x-ray tube efficiency $\gamma$ input at 52; and size of the imaged area, A, at the source-to-image distance (SID) input at 54. Specifically, as shown in FIG. 2, the prediction of radiation exposure/Air-Kerma at a predefined arbitrary distance during a radiographic x-ray exposure uses inputs 48 (mAs), 50 (SOD) and 52 ($\gamma$); and the prediction of radiation exposure/Air-Kerma area product for a radiographic x-ray exposure uses inputs 48 (mAs), 52 ($\gamma$), and 54 (SID).

The structure of the neural network of FIG. 2 is uniquely determined by two weighting matrices, $W_1$ and $W_2$, and two corresponding bias vectors, $b_1$ and $b_2$. There are four neurons in the first layer which all use the hyperbolic tangent sigmoidal transfer function. The second layer, or output layer, has just a single input linear transfer function neuron.

Continuing with FIG. 2, there is illustrated the input-output relationship of the input scaling stage, where the inputs are:

| | |
|---|---|
| RAD kvp | any legitimate kvp value for diagnostic system |
| Copper thickness | in mm |
| Aluminum thickness | in mm |

which are used to construct the input vector as $$in=[kVp\ Cu\ Al]^T$$

where T indicates a transposed vector.

Furthermore, there are three input normalization functions defined by the following relationships:

$$kVp'=norm\_kVp(kVp)=(kVp-kVp\_min)/(kVp\_max-kVp\_min)$$

where kVp_min=minimum kVp of system, kVp_max=maximum kVp of system, and kVp=the actual kVp.

And $$Cu'=norm\_Cu(Cu)=Cu/Cu\_max$$

where

Cu_max=maximum copper thickness, in mm, on system, and

Cu=the actual thickness of copper filters, in mm, on the system.

And $$Al'=norm\_Al(Al)=(Al-Al\_min)/(Al\_max-Al\_min)$$

where

Al_min=1.0 mm

Al_max=maximum aluminum thickness, in mm, on system,

Al=the actual equivalent aluminum thickness, in mm, on the system.

The given normalization functions create the input vector to the neural network $$in'=[kVp'Cu'Al']^T.$$

Continuing, the neural network coefficients comprise the weighting matrix from layer 1

$$W_1 = \begin{bmatrix} w_1(0,0) & w_1(1,0) & w_1(2,0) \\ w_1(0,1) & w_1(1,1) & w_1(2,1) \\ w_1(0,2) & w_1(1,2) & w_1(2,2) \\ w_1(0,3) & w_1(1,3) & w_1(2,3) \end{bmatrix},$$

the bias vector from layer 1

$$b_1=[b_1(0)b_1(1)b_1(2)b_1(3)]^T,$$

the weighting matrix from layer 2

$$W_2=[w_2(0)w_2(1)w_2(2)w_2(3)]^T,$$

and the bias for layer 2:

$$b_2=b_2(0).$$

Therefore, the neural net output calculation becomes $$E=W_2*\text{tansig}(W_1*in'+b_1)+b_2$$

where the hyperbolic tangent sigmoid transfer function (tansig) is defined as $$\text{tansig}(x)=2/(1+\exp(-2*x))-1.$$

The neural network coefficients for a fixed source-to-image distance and mAs, specifying the weighting matrices and bias vectors from layer 1 and 2, are obtained by training the neural net with a set of x-ray parameters, comprising kVp, aluminum thickness, copper thickness and resulting exposure or Air-Kerma values developed from either experimental data or theoretical models.

Since some variability may occur in the x-ray tube efficiency, the output is scaled by the Tube Efficiency Factor $\gamma$, which is calibrated at a single point before initial use.

For an arbitrary mAs, the output is scaled linearly with the ratio of the actual mAs value and the one used to train the neural network.

For an arbitrary source-to-object distance (SOD), the output is scaled by the square of the ratio of actual SOD and the SID used to train the neural network, according to the "R-square law".

The exposure or Air-Kerma area product is independent of the SOD. The area product requires that the source-to-image distance (SID) as well as the area of the exposed x-ray field at the SID are known. Those skilled in the art will know that on a conventional radiographic x-ray system, the SID is known from system calibration. The area of the exposed x-ray field can be predicted by any suitable method, such as by calibrating the electric signal supplied to the horizontal and vertical collimator blades to their position on the x-ray image, or from a digital signal obtained directly from the x-ray image by a horizontal and vertical cross sectional analysis to determine blade positions.

From this, the exposure or Air-Kerma area product can be obtained by predicting the exposure of Air-Kerma at the SID for which the neural network was trained, and then scaling the result by the imaged area.

The exposure of Air-Kerma prediction is based on the information of kVp, mAs, and the type of spectral filters, i.e., copper filter thickness and aluminum filter thickness. The exposure/Air-Kerma is predicted for a specified source-to-object distance (SOD), and the exposure/Air-Kerma area product is predicted for a specified source-to-image distance (SID). For other distances, the "R-square law" is applied, by correcting with the square of the distance between tube and patient, or SOD.

The structure of the neural network is uniquely determined by two weighting matrices and two corresponding bias vectors. There are four neurons in the first layer which all use the hyperbolic tangent sigmoidal transfer function. The second layer, i.e., the output layer, has just a single input linear transfer function neuron.

The invention has been described in detail with particular reference to certain preferred embodiments thereof, but it will be understood that modifications and variations can be effected within the spirit and scope of the invention.

What is claimed is:

1. A method for predicting radiation exposure upon an object, employing an x-ray tube to produce an x-ray beam, there being certain known materials between the x-ray tube and the object, the method comprising the steps of:

a) measuring voltage applied to the x-ray tube;

b) measuring current applied to the x-ray tube;

c) defining a spectral filtration using composition, density, and thickness of the known materials between the x-ray tube and the object;

d) measuring a source-to-object distance from a focal spot of the x-ray tube to the object; and e) using a neural network to calculate a predicted amount of radiation exposure upon the object using the measured voltage, the measured current, the defined spectral filtration and the measured distance, including receiving first and second inputs at a first neuron layer of the neural network, the first neuron layer comprising first and second first-layer neurons, the first input being a function of the measured voltage, and the second input pertaining to the spectral filtration;

producing, at the first first-layer neuron, a first first-layer output based on a first set of weighting coefficients for the first and second inputs;

producing, at the second first-layer neuron, a second first-layer output based on a second set of weighting coefficients for the first and second inputs;

receiving the first and second first-layer outputs from the first neuron layer at a second neuron layer;

producing a second-layer output at the second neuron layer, the second-layer output being a function of the first and second first-layer outputs; and wherein calculating the predicted amount of radiation exposure includes combining the second-layer output, the measured current, and the measured distance.

2. A method as claimed in claim 1, wherein the combining step comprises multiplying the second-layer output, the measured current, and the measured distance.

3. A method for predicting radiation exposure upon an object, employing an x-ray tube to produce an x-ray beam, there being certain known materials between the x-ray tube and the object, the method comprising the steps of:

a) measuring voltage applied to the x-ray tube;

b) measuring current applied to the x-ray tube;

c) defining a spectral filtration using composition, density, and thickness of the known materials between the x-ray tube and the object;

d) measuring a source-to-object distance from a focal spot of the x-ray tube to the object; and e) using a neural network to calculate a predicted amount of radiation exposure upon the object using the measured voltage, the measured current, the defined spectral filtration and the measured distance, including receiving first and second inputs at an input scaling stage, the first input being a function of the measured voltage, and the second input pertaining to the spectral filtration;

applying, at the input scaling stage, (i) a first scale factor to the first input to produce a first scaled input, and (ii) a second scale factor to the second input to produce a second scaled input;

receiving the first and second scaled inputs at a first neuron layer of the neural network, the first neuron layer comprising first and second first-layer neurons;

producing, at the first first-layer neuron, a first first-layer output based on a first bias coefficient and a first set of weighting coefficients for the first and second scaled inputs;

producing, at the second first-layer neuron, a second first-layer output based on a second bias coefficient and a second set of weighting coefficients for the first and second scaled inputs;

receiving the first and second first-layer outputs from the first neuron layer at a second neuron layer of the neural network;

producing a second-layer output at the second neuron layer, the second-layer output being a function of the first and second first-layer outputs;

receiving, at an output scaling stage, (i) the second-layer output from the second neuron layer, (ii) an efficiency input that is a function of an efficiency the x-ray tube, and (iii) a current input that is a function of the measured current; and combining the second-layer output, the efficiency input, and the current input to produce the predicted amount of radiation exposure, the combining step being performed at the output scaling stage.

4. A method as claimed in claim 3, wherein the combining step comprises multiplying the second-layer output, the efficiency input, and the current input.

5. A system for implementing a radiation exposure prediction and a radiation exposure area product prediction for an object to be imaged, employing an x-ray tube to produce an x-ray beam, the system comprising:

a) means for measuring a voltage applied to the x-ray tube;

b) means for measuring a current applied to the x-ray tube;

c) means for defining a spectral filtration using composition, density, and thickness of materials between the x-ray tube and the object to be imaged;

d) means for measuring a distance from a focal spot of the x-ray tube to the object to be imaged; and e) means for calculating radiation exposure prediction and radiation exposure area product prediction for the object to be imaged using the voltage, current and distance, and the defined spectral filtration, wherein the means for calculating comprises (1) an input scaling stage, the input scaling stage receiving first, second and third inputs, wherein the first input is a function of the voltage applied to the x-ray tube, the second input pertains to spectral filtration achieved by a first filter in an x-ray beam produced by the x-ray tube, and the third input pertains to spectral filtration achieved by a second filter in the x-ray beam produced by the x-ray tube, the first and second filters being at least part of the materials between the x-ray tube and the object to be imaged and wherein the input scaling stage applies (i) a first scale factor to the first input to produce a first scaled input, (ii) a second scale factor to the second input to produce a second scaled input and (iii) a third scale factor to the third input to produce a third scaled input;

(2) a first neuron layer, the first neuron layer comprising a plurality of first-layer neurons that receive the first, second and third scaled inputs, each respective neuron producing an output based on (i) a respective bias coefficient for the respective neuron, (ii) weighting coefficients for the first, second and third scaled inputs and (iii) a hyperbolic tangent transfer function;

(3) a second neuron layer, the second neuron layer comprising an output neuron, the output neuron producing an output based on the outputs of the plurality of first layer neurons and (4) an output scaling stage, the output scaling stage receiving (i) the output from the output neuron, (ii) an efficiency input that is a function of an efficiency of the x-ray tube, (iii) a current input that is a function of the current applied to the x-ray tube, and the output scaling stage combining the output from the output neuron, the efficiency input and the current input to produce the radiation exposure prediction.

6. An x-ray system comprising:

(A) an x-ray tube, the x-ray tube being configured to produce an x-ray beam;

(B) a voltage measurement circuit, the voltage measurement circuit being configured to measure a voltage applied to the x-ray tube;

(C) a current measurement circuit, the current measurement circuit being configured to measure a current applied to the x-ray tube;

(D) an imager having an image area;

(E) a filter system, the filter system including a filter that is located between the x-ray tube and the imager; and (F) a neural network system for predicting radiation exposure on an object imaged by the x-ray system, the neural network system including (1) a first neuron layer, the first neuron layer comprising a plurality of first-layer neurons that receive first and second inputs, the first input being a function of the voltage applied to the x-ray tube and measured by the voltage measurement circuit, and the second input being a function of a spectral filtration achieved by the filter on an x-ray beam produced by the x-ray tube, each respective neuron producing an output based weighting coefficients for the first and second inputs, (2) a second neuron layer, the second neuron layer comprising an output neuron, the output neuron producing an output based on the outputs of the plurality of first-layer neurons, (3) an output stage, the output stage receiving the output from the output neuron and an efficiency input that is a function of an efficiency of the x-ray tube, and the output stage producing an exposure output as a function of the output from the output neuron and the efficiency input, the exposure output being indicative of an amount of radiation received by the object.

7. A method of predicting radiation exposure upon an object, comprising:

receiving first and second inputs at a first neuron layer of a neural network, the first neuron layer comprising first and second first-layer neurons, the first input being a function of a voltage applied to the x-ray tube, and the second input pertaining to spectral filtration achieved by a filter on an x-ray beam produced by the x-ray tube;

producing, at the first first-layer neuron, a first first-layer output based on a first bias coefficient and a first set of weighting coefficients for the first and second inputs;

producing, at the second first-layer neuron, a second first-layer output based on a second bias coefficient and a second set of weighting coefficients for the first and second inputs;

receiving the first and second first-layer outputs from the first neuron layer at a second neuron layer;

producing a second-layer output at the second neuron layer, the second-layer output being a function of the first and second first-layer outputs;

producing an exposure output that is indicative of an amount of radiation received by the object, the producing step being performed based on (i) the second-layer output, (ii) an efficiency input that is a function of an efficiency of the x-ray tube, and (iii) a current input that is a function of a current applied to the x-ray tube.

8. An x-ray system comprising:

(A) an x-ray tube, the x-ray tube being configured to produce an x-ray beam;

(B) a voltage measurement circuit, the voltage measurement circuit being configured to measure a voltage applied to the x-ray tube;

(C) a current measurement circuit, the current measurement circuit being configured to measure a current applied to the x-ray tube;

(D) an imager having an image area;

(E) a filter system, the filter system including a filter that is located between the x-ray tube and the imager; and (F) a neural network system for predicting radiation exposure on an object imaged by the x-ray system, the neural network system including (1) a first neuron layer, the first neuron layer comprising a plurality of first-layer neurons that receive first and second inputs, the first input being a function of the voltage applied to an x-ray tube and measured by the voltage measurement circuit, and the second input being a function of a spectral filtration achieved by the filter on an x-ray beam produced by the x-ray tube, each respective neuron producing an output based on (i) a respective bias coefficient for the respective neuron, (ii) weighting coefficients for the first and second inputs, (2) a second neuron layer, the second neuron layer comprising an output neuron, the output neuron producing an output based on the outputs of the plurality of first-layer neurons, (3) an output stage, the output stage receiving (i) the output from the output neuron, (ii) an efficiency input that is a function of an efficiency of the x-ray tube, and (iii) a current input that is a function of the current applied to the x-ray tube and measured by the current measurement circuit,-and the output stage producing an exposure output as a function of the output from the output neuron, the-efficiency input, and the current input, the exposure output being indicative of an amount of radiation received by the object.

9. An x-ray system comprising:

(A) an x-ray tube, the x-ray tube being configured to produce an x-ray beam;

(B) a voltage measurement circuit, the voltage measurement circuit being configured to measure a voltage applied to the x-ray tube;

(C) a current measurement circuit, the current measurement circuit being configured to measure a current applied to the x-ray tube;

(D) an imager having an image area;

(E) a filter system, the filter system including first and second filters that are located in series between the x-ray tube and the imager; and (F) a neural network system for predicting radiation exposure on an object imaged by the x-ray system, the neural network system including (1) an input scaling stage, the input scaling stage receiving first, second and third inputs, wherein the first input is a function of the voltage applied to an x-ray tube and measured by the voltage measurement circuit, the second input pertains to spectral filtration achieved by the first filter on an x-ray beam produced by the x-ray tube, and the third input pertains to spectral filtration achieved by the second filter on the x-ray beam produced by the x-ray tube, and wherein the input scaling stage applies (i) a first scale factor to the first input to produce a first scaled input, (ii) a second scale factor to the second input to produce a second scaled input, and (iii) a third scale factor to the third input to produce a third scaled input;

(2) a neural network including (i) a first neuron layer, the first neuron layer comprising a plurality of first-layer neurons that receive the first, second and third scaled inputs, each respective neuron producing an output based on (i) a respective bias coefficient for the respective neuron, (ii) weighting coefficients for the first, second and third scaled inputs, and (iii) a hyperbolic tangent transfer function, (ii) a second neuron layer, the second neuron layer comprising an output neuron, the output neuron producing an output based on the outputs of the plurality of first-layer neurons, (3) an output scaling stage, the output scaling stage receiving (i) the output from the output neuron, (ii) an efficiency input that is a function of an efficiency the x-ray tube, and (iii) a current input that is a function of the current applied to the x-ray tube and measured by the current measurement circuit, and the output scaling stage multiplying the output from the output neuron, the efficiency input, and the current input to produce an exposure output that is indicative of an amount of radiation received by the object.

10. A method of predicting radiation exposure upon an object, comprising:

receiving first and second inputs at an input scaling stage, the first input being a function of a voltage applied to the x-ray tube, and the second input pertaining to spectral filtration achieved by a filter on an x-ray beam produced by the x-ray tube;

applying, at the input scaling stage, (i) a first scale factor to the first input to produce a first scaled input, and (ii) a second scale factor to the second input to produce a second scaled input;

receiving the first and second scaled inputs at a first neuron layer of a neural network, the first neuron layer comprising first and second first-layer neurons;

producing, at the first first-layer neuron, a first first-layer output based on a first bias coefficient and a first set of weighting coefficients for the first and second scaled inputs;

producing, at the second first-layer neuron, a second first-layer output based on a second bias coefficient and a second set of weighting coefficients for the first and second scaled inputs;

receiving the first and second first-layer outputs from the first neuron layer at a second neuron layer of the neural network;

producing a second-layer output at the second neuron layer, the second-layer output being a function of the first and second first-layer outputs;

receiving, at an output scaling stage, (i) the second-layer output from the second neuron layer, (ii) an efficiency input that is a function of an efficiency the x-ray tube, and (iii) a current input that is a function of a current applied to the x-ray tube; and multiplying the second-layer output, the efficiency input, and the current input, the multiplying step being performed at the output scaling stage, and the multiplying step producing an exposure output that is indicative of an amount of radiation received by the object.

11. A method as claimed in claim 10, wherein the neural network consists of only first and second layers.

* * * * *

UNITED STATES PATENT AND TRADEMARK OFFICE

CERTIFICATE OF CORRECTION

PATENT NO. : 6,422,751 B1 
DATED : July 23, 2002
INVENTOR(S) : Richard Aufrichtig et al.

It is certified that error appears in the above-identified patent and that said Letters Patent is hereby corrected as shown below:

Column 6,
Line 13, insert -- of -- after "efficiency".

Column 8,
Lines 45 and 47, delete "-" between the words "circuit,-and"

Column 9,
Line 32, insert -- of -- after "efficiency".

Column 10,
Line 29, insert -- of -- after "efficiency".

Signed and Sealed this

Twenty-sixth Day of August, 2003

JAMES E. ROGAN
*Director of the United States Patent and Trademark Office*